United States Patent [19]
Farrington et al.

[11] Patent Number: 4,962,862
[45] Date of Patent: Oct. 16, 1990

[54] THERMOPLASTIC CONTAINER HAVING END WALL BUTT-WELDED TO BODY

[75] Inventors: Edward J. Farrington, Vinkeveen; Gerrit J. Van Keimpema, Woerden, both of Netherlands

[73] Assignee: Koninklijke Emballage Industrie Van Leer B.V., Amstelveen, Netherlands

[21] Appl. No.: 353,458

[22] Filed: May 18, 1989

[30] Foreign Application Priority Data

May 27, 1988 [NL] Netherlands .......................... 8801370

[51] Int. Cl.$^5$ .............................................. B65D 8/04
[52] U.S. Cl. ................................ 220/613; 220/356; 220/359; 220/DIG. 29
[58] Field of Search ................. 220/67, 356, 357, 359, 220/363, 378, DIG. 29

[56] References Cited

U.S. PATENT DOCUMENTS

| | | | |
|---|---|---|---|
| 3,432,072 | 3/1969 | Quercia | 220/67 |
| 3,434,644 | 3/1969 | Collie | 220/67 |
| 4,402,461 | 9/1983 | Woerz et al. | 220/67 |
| 4,579,242 | 4/1986 | Ellis | 220/67 |
| 4,762,249 | 8/1988 | Fortuna et al. | 220/359 |

FOREIGN PATENT DOCUMENTS 0028116 6/1981 European Pat. Off. .
0210679 2/1987 European Pat. Off. .

OTHER PUBLICATIONS

Edward M. Petrie, "Joining the Engineering Plastics", Aug. 1980, pp. 14–23.
Campbell, "Joining Plastics with Fusion Bonding", Machine Design, vol. 52, No. 23, 10/80, pp. 136–140.

Primary Examiner—David T. Fidei
Attorney, Agent, or Firm—Brumbaugh, Graves, Donohue & Raymond

[57] ABSTRACT

The invention deals with the butt-welded connection between the endwall and the body of a thermoplastic container. Contrary to the known connection the invention provides the endwall with an axially extending edge, which may form part of a gripping edge and which overlaps the weld, so that the weld beads are hidden, while further the area of transition between the endwall and its edge above the weld has an axial thickness which is in essence the same as the thickness of the endwall and the radial thickness of the axially extending edge of the endwall, so that the material flow of the plastic during molding of the endwall is more even.

2 Claims, 4 Drawing Sheets

THERMOPLASTIC CONTAINER HAVING END WALL BUTT-WELDED TO BODY

BACKGROUND OF THE INVENTION

The invention relates to a container, comprising a body, made of thermoplastic material, and end walls, at least one of which is made of a thermoplastic material, said body and end wall being butt-welded to each other with flat weld faces lying at right angles to the axis of the body, the weld face of the body being of a width which prior to welding is essentially equal to the wall thickness of the body, while the weld face of the end wall is of a width which is greater than the width of the weld face of the body and has an external diameter which is greater than the external diameter of the body, and said end wall has an axially and radially outward-facing flange which forms a gripping edge.

Such a container is known. In this known container the body and one or both end walls are welded to each other by means of so-called heated-tool welding, i.e. welding in which the faces to be welded to each other are brought to welding temperature by means of a hot plate, the heated tool, following which the plate is removed and the two heated weld faces are pressed together and fused. The heated tool is a plate which is flat on both sides. Only those faces of body and end wall which are to be welded to each other may be brought into contact with this tool. In the case of the body this is no problem, because it is a continuous cylindrical tube. However, the end wall is more complex in shape, in particular due to the fact that there must be a gripping edge which makes it possible to take hold of the container, not only by hand, but in particular with a gripping device designed for the purpose, which can grip the gripping edge at two opposite faces. During handling with a gripping device, the gripping edge and the place where the material passes from the gripping edge to the end wall must be sturdy. Besides, the gripper must not grip the weld point. All this means that in the case of the known container the weld face of the end wall is located inwards from the innermost face of the gripping edge, viewed in the axial direction. On account of these considerations, the transition from an end wall to the gripping edge, situated near the weld point, has a large volume of material. This volume is at the end of the flow path of the liquid plastic in the injection mould. With the known form of gripping edge, the stream of liquid plastic has to divide during injection moulding into a stream going to the hollow for the gripping edge and a stream going to the part which forms the weld face of the end wall after setting of the plastic.

The face which is going to form the weld face is an end face for the flow front. This and the preceding dividing, which gives rise to eddies, results in shape inaccuracies when the plastic material is contracting and shrinking during cooling, and while these types of inaccuracies do not prevent a good welded joint from being obtained, they can extend the welding time.

This known container is of excellent quality and meets all the international strength and safety standards laid down by law, but it does have a number of disadvantages and, if they could be eliminated, an even better container would be produced. For example, the welded seam is ugly, while the bottom gripper can glance off the weld and then no longer properly grips the face intended for the gripper. The concentricity of cover and body can have a slight deviation of about 1.5 mm, but the consequence of this is that the weld face of the end wall has to be wider than the weld face of the body, for locally the body can be fused more inwards or more outwards with the weld face of the end wall.

It is known to mill away the weld edge partially in order to improve the appearance and produce a better grip for the gripper. If the weld edge locally is far inwards, then a part of the section of the end wall connecting to the weld has to be milled away, which is at the expense of the strength.

SUMMARY OF THE INVENTION

The object of the invention is then to produce a container in which the weld seam can no longer be a problem and no longer needs milling away, while the welding time can be reduced further.

This object is achieved according to the invention in the first place in that the outside edge of the end wall has an axially extending edge bounding the weld face of the end wall on the outside and overlapping the weld, and the axial thickness of the end wall at the point of the weld is essentially equal to or slightly greater than the radial thickness of the axially extending edge or the thickness of the end wall.

This axially extending edge conceals the weld from view and takes it outside the working range of a gripper when it has to grip the projecting edge. The stream of liquid plastic is now no longer divided near the weld face and it no longer forms an end face against which the stream runs. Shape inaccuracies can be avoided partly due to the fact that the edge part of the end wall is given a material thickness which at the site of the weld and outwards from the weld is the same as the material thickness of the end wall itself and in any case is not greater than 20% more than the thickness of the end wall, as a result of which the welding time can be reduced further and can be less than the previously achieved welding time of 2 minutes.

Since less material is needed in the edge of the end edge (the saving is of the order of magnitude of 100 grammes), and due to the more uniform distribution of the wall thickness, the production time of the end wall is also shorter.

It is surprising that the reduction in material at the edge of the end wall produces a container which is better able to withstand the forces occurring when a filled container is moved with the grippers of a hoisting device gripping the gripping edges. This is probably due to the greater flexibility of the edge part, which is thinner and thus more flexible at the point of transition of the gripping edge to the part of the end wall situated further inwards. This flexibility is not, however, at the expense of the quality of the welded seam but, on the contrary, the welded seam can follow the deformations occurring, probably due to the fact that the welded seam has acquired the same or better quality due to the fact that there are fewer stresses on the welded seam because of the absence of shape inaccuracies.

In a container in which the flange forming the gripping edge forms the outside edge of the end wall and forms an essentially V-shaped groove with the wall of the end wall lying inwards from it, and in which said flange has a bottom face situated radially outside the body and facing away from the groove, as in the case of the known container, according to the invention the axially extending edge overlapping the weld in the axial direction will form the bottom face of the flange, while the axial distance between said bottom face and the bottom of the groove is greater than the axial distance between said bottom and the weld face, and the latter axial distance is the axial distance from the end wall, which is essentially equal to or slightly greater than the radial thickness of the flange, and thus of the axially projecting edge or the thickness of the end wall. The gripping edge and the axially projecting edge overlapping the weld are then integrated to a flange which is thus at the weld, as in the case of the known container, but is displaced in the axial direction, so that the weld and the bottom of the V-shaped groove have come closer together. For a good grip of the grippers on the gripping edge, it is necessary for the distance between the two opposite faces of the gripping edge, on which faces the grippers grip, to be essentially the same distance as that in the known container. These are thus the bottom face of the flange and the bottom of the groove.

It is, however, also conceivable to have an embodiment in which the end wall at the position of the weld is provided with the axially inward-projecting edge which overlaps the weld, and in which the flange forming the gripping edge is at a different position of the end wall, i.e. axially at a distance from the weld. In that case the improvement of the weld is retained due to the fact that shape inaccuracies are avoided, while the weld is also concealed from view. Milling away is no longer necessary in any case.

The central part of the end wall is at an axial distance from the plane through the weld point which is equal to that of the known container. This end wall is in the shape of a bowl with a flat bottom, diverging walls and an edge which is outwardly provided with a flange. This shape is desirable for the required resistance of the container to stresses occurring, such as impact stresses.

The dimensions of the gripping edge are also defined, by the gripper gripping them as explained above. The container according to the invention thus essentially differs from the known container, at least in the embodiment in which the gripping edge is at the position of the weld, in that the flange is displaced axially inwards, so that weld face and bottom of the V-shaped groove have come closer to each other. The invention can thus also be seen in the method of production of the end wall and thus the production of a container.

The invention also relates to a device for the production of a container, said device in the existing embodiment being characterized by means for clamping an end wall, means for clamping a body, and a heatable plate which can be placed between the body and the end wall to be welded to each other, and with which the faces to be welded to each other are heated and then pressed onto each other after removal of the heated plate, said device according to the invention being characterized in that the plate at the side facing the end wall is provided with a circular rib which projects beyond the plane of the plate, and of which the external face standing at right angles to the longitudinal axis of the circular plate forms the face for heating of the weld face of the end wall, while the external diameter thereof is smaller than the diameter of the axially projecting edge of the outside edge of the end wall of the container.

The flat heated plate is thus replaced by a plate which is flat at the side facing the body, as in the known device, but which at the side facing the end wall has a rib which with its outside edge fits inside the axially projecting edge, and with which the weld face of the end wall can thus be heated.

BRIEF DESCRIPTION OF THE DRAWINGS

The invention will now be explained in greater detail with reference to the drawings.

DESCRIPTION OF THE PREFERRED EMBODIMENTS

Figure 1:
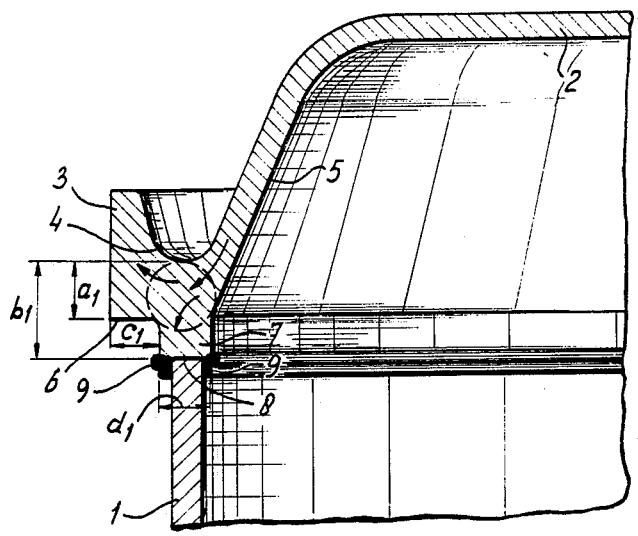
FIG. 1 shows in cross section the known welded joint of a container.

FIG. 1 shows a container body 1 obtained by extrusion and an end wall 2 produced by injection moulding. This end wall 2 has at the outside edge a flange 3 which passes via a V-shaped groove 4 into the part of the end wall which slants upwards and is indicated by 5, said groove 4 together with the bottom face 6 forming the gripping edge.

This edge part of the end wall has a rib 7 with a weld face 8 for welding thereto the end edge of the body 1. The welded joint is indicated by the welding beads 9.

In this drawing the distance between the bottom of the groove 4 and the bottom face 6 of the flange 3 is indicated by "$a_1$". The distance between the bottom of the groove 4 and the weld face is indicated by "$b_1$". It can be seen clearly that "$a_1$" is smaller than "$b_1$". It can also be seen clearly that the transition from the end wall part 5 to the flange 3 takes place by means of a large quantity of material above the weld, which is indicated by a circle in which the division of the stream is shown by arrows.

The bottom face 6 of the flange 3 has a width "$c_1$" and the weld face has a width "$d_1$", which is greater than the thickness of the body 1.

It can be seen clearly that the welding beads 9 can project far.

Figure 2:
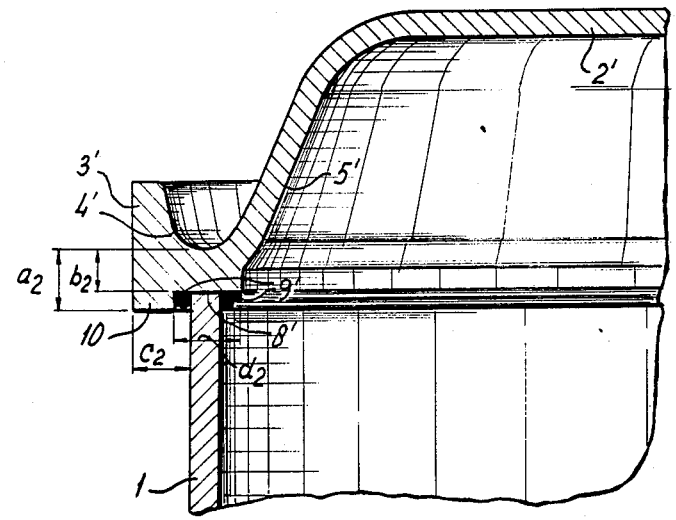
FIG. 2 shows in the same way as in FIG. 1 the welded joint of a container according to the invention.

FIG. 2 shows the embodiment according to the invention. The body is indicated again by 1 and the end wall by 2', the side part being indicated by 5', The flange is indicated by 3' and again forms the V-shaped groove 4' with the side part 5', The flange 3', the height or axial dimension of which is equal to that of FIG. 1 is, however, axially displaced here, and thus forms the axially extending part 10 overlapping the weld face 8'. While in the case of the known joint shown in FIG. 1 part of the rib 7 also often has to be milled away during the milling away of the welding bead 9, in the embodiment according to the invention this is no longer necessary and is not possible either. The outermost welding bead 9' is totally concealed from view.

The distances shown in FIG. 1 are also indicated in FIG. 2, but it is now clear that the distance "$a_2$" is greater than "$b_2$", and thus through the axial displacement of the flange the quantity of material is reduced at the transition between the side wall 5' and the flange.

The distance "$c_2$" is now greater than "$c_2$", so that the gripper has a broader engagement face free from conflict with the welding bead 9'.

The width of the weld face 8' is indicated by "$d_2$", and the latter is greater than "$d_1$", in order to be able to make allowances for the out-of-roundness of the body and the room needed for the weld groove.

"$a_1$" and "$a_2$" have remained virtually the same.

Figure 3:
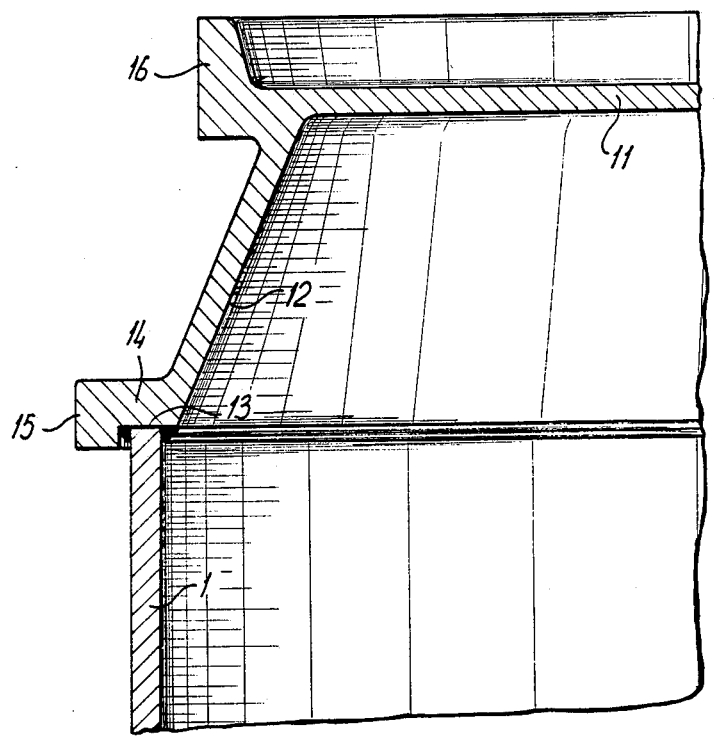
FIG. 3 shows a variant of the container design according to the invention.

FIG. 3 shows another embodiment of the end wall. The body here is also indicated by number 1, but the end wall 11 with the slanting side wall part 12 merges at the welded joint 13 via a short horizontal part 14 into an edge 15, which projects axially over the weld 13.

The gripping edge or flange 16 is now at the same level as the transition between the horizontal part 11 of the end wall and the slanting part 12.

The weld is also concealed from view in this embodiment. However, the gripper now no longer engages with the edge 15, but with the flange 16, and during injection moulding this flange 16 cannot give any problems which are of importance for the welded joint, because there is no welded joint at that point, and the filling with liquid plastic is ensured by the thrust resistance which the flow undergoes in the branch relating to the slanting wall part 12. No additional quantity of material is present at the weld, so that shape irregularities do not occur there.

Figure 4:
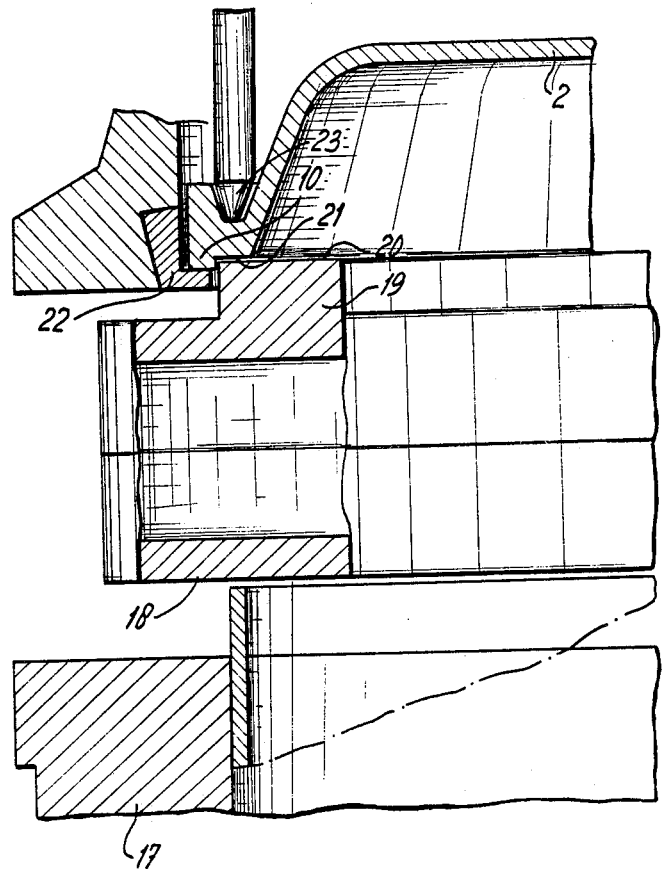
FIG. 4 shows schematically in cross section how the device for producing the welded joint works.

FIG. 4 shows schematically the device for producing a container according to the invention. In this figure the body is indicated by 1 and is clamped in a body clamp 17. The heated plate has a heated plate surface 18 for heating the weld face of the body, and has at the opposite side a circular rib 19 which has a rectangular section and with the face 20 forms the face which serves for heating of the weld face 21 of the end wall 2. The rib 20 has an external diameter which is smaller than the internal diameter of the projecting edge 10, so that the weld face 21 can be heated using the face 20. The end wall 2 is held fast here by the grippers 22, which engage with the bottom edge of the flange 3, and by supports 23 engaging in the V-shaped groove.

When the weld faces have been brought to fusing temperature, the heated plate is removed, and the weld faces are pressed onto each other.

Figure 5:
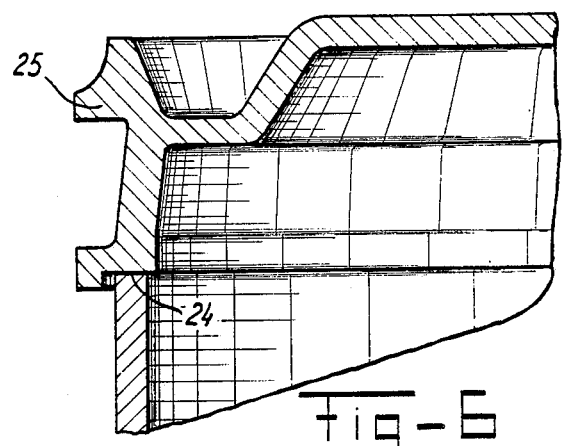
FIGS. 5, 6 and 7 show various design variants of the container according to the invention.

FIG. 5 shows an embodiment which is essentially the same as FIG. 3 at the welded joint 24. Only the gripping edge 25 is differently shaped.

Figure 6:
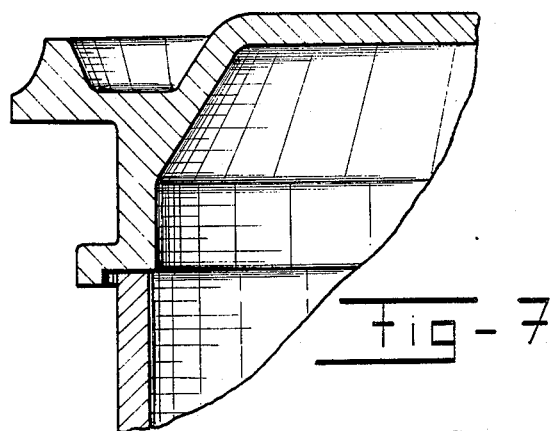

This also applies to the embodiment of FIG. 6.

Figure 7:
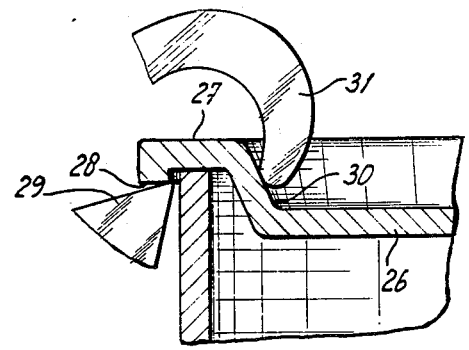

In the embodiment of FIG. 7 the end wall forms a recessed part 26, which with a flanged edge 27 grips over the end edge of the body and is welded fast.

In this embodiment the bottom edge 28 of the edge 27 forms one face for the gripper 29, and the inner face 30 forms the engagement face for the other gripper 31. In all these embodiments the flow of melt is not divided at the weld face, the weld face is not an end face for the flow of melt, and the weld is not adversely affected and contributes to the external appearance and strength.

We claim:

1. Container comprising a circular cylindrical vessel body made of thermoplastic material having a predetermined wall thickness and a longitudinal axis, and a circular end wall closing the upper end of said body, said end wall having a predetermined wall thickness and having an integral axially and radially outwardly-facing flange having an external diameter greater than the external diameter of said vessel body the underside of which forms a gripping edge, said vessel body and said end wall being heated-tool butt-welded to each other at confronting circular weld faces lying in a plane disposed at right angles to the axis of said vessel body, the weld face of the vessel body having a radial width which prior to welding is substantially equal to said predetermined wall thickness, and the weld face of the end wall having a width greater than the wall thickness of the vessel body and being defined by an axially-extending annular-shaped surface formed in the underside of said flange having inner and outer diameters respectively smaller and larger than the inner and outer diameters of said vessel body and being surrounded by an axially extending edge which bounds the flange on the outside and extends axially a predetermined distance beyond the plane of the weld face so as to surround and conceal the weld, said end wall having an axial thickness in the region of the weld face equal to or slightly greater than the radial width of said axially extending edge and slightly greater than the wall thickness of the portion of the end wall which is surrounded by said flange.

2. Container according to claim 1, wherein said outwardly-facing flange forms the outside edge of the end wall and with a portion of the end wall which lies inwardly from it forms a V-shaped groove, and the axially extending edge which bounds the flange has an annular-shaped face situated radially outside the vessel body and facing away from said groove and forms said gripping edge, wherein flange and the axial distance (a) between the face of the axially-extending edge and the bottom of said groove is greater than the axial distance (b) between the face of the axially-extending edge and the weld face, and wherein said distance (b) is equal to or slightly greater than the radial distance between the outer diameter of the vessel body and the outer diameter of said flange.

* * * * *